(12) United States Patent
Han et al.

(10) Patent No.: US 11,482,758 B2
(45) Date of Patent: Oct. 25, 2022

(54) SEPARATOR INCLUDING POROUS POLYMER SUBSTRATE, POROUS COATING LAYER, AND RESIN LAYER AND ELECTROCHEMICAL DEVICE HAVING THE SAME APPLIED THERETO

(71) Applicant: LG CHEM, LTD., Seoul (KR)

(72) Inventors: Da Kyung Han, Daejeon (KR); Seung Hyun Lee, Daejeon (KR); Dong Wook Sung, Daejeon (KR); Je An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 158 days.

(21) Appl. No.: 16/634,696

(22) PCT Filed: Dec. 24, 2018

(86) PCT No.: PCT/KR2018/016557
§ 371 (c)(1),
(2) Date: Jan. 28, 2020

(87) PCT Pub. No.: WO2019/135532
PCT Pub. Date: Jul. 11, 2019

(65) Prior Publication Data
US 2020/0212400 A1 Jul. 2, 2020

(30) Foreign Application Priority Data
Jan. 8, 2018 (KR) .................. 10-2018-0002493

(51) Int. Cl.
*H01M 50/446* (2021.01)
*H01M 10/0525* (2010.01)
(Continued)

(52) U.S. Cl.
CPC ..... *H01M 50/446* (2021.01); *H01M 10/0525* (2013.01); *H01M 50/40* (2021.01);
(Continued)

(58) Field of Classification Search
CPC .. H01M 50/446; H01M 50/40; H01M 50/403; H01M 50/46; H01M 50/409; H01M 50/449
(Continued)

(56) References Cited

U.S. PATENT DOCUMENTS

| 8,389,587 B2 | 3/2013 | Pan et al. |
| 8,916,283 B2 | 12/2014 | Hayakawa et al. |

(Continued)

FOREIGN PATENT DOCUMENTS

| CN | 102732185 B | 1/2016 |
| EP | 3518318 A1 | 7/2019 |

(Continued)

OTHER PUBLICATIONS

Extended European Search Report, dated Nov. 12, 2020, for European Application No. 18897911.6.
(Continued)

*Primary Examiner* — Sean P Cullen
(74) *Attorney, Agent, or Firm* — Birch, Stewart, Kolasch & Birch, LLP

(57) ABSTRACT

A separator for secondary batteries that allows the amount of a dispersing resin that is used and the amount of a dispersant that is used to be reduced in order to prevent an increase in resistance after the separator is coated, which occurs in the case in which a large amount of the dispersing resin is used in order to disperse inorganic matter, and an electrochemical device having the same applied thereto. The amount of a dispersing resin is reduced, whereby it is possible to prevent an increase in resistance after a porous separator is coated, (Continued)

a dispersing resin having a specific weight average molecular weight is mixed, whereby physical properties and dispersivity are improved, and the use of an expensive dispersant is excluded, whereby processing costs are reduced.

11 Claims, 2 Drawing Sheets

(51) Int. Cl.
    *H01M 50/46*     (2021.01)
    *H01M 50/403*     (2021.01)
    *H01M 50/40*     (2021.01)
    *H01M 50/409*     (2021.01)
    *H01M 50/449*     (2021.01)

(52) U.S. Cl.
    CPC ....... *H01M 50/403* (2021.01); *H01M 50/409* (2021.01); *H01M 50/449* (2021.01); *H01M 50/46* (2021.01)

(58) Field of Classification Search
    USPC .......................................... 429/144, 251, 254
    See application file for complete search history.

(56) References Cited

U.S. PATENT DOCUMENTS

| | | |
|---|---|---|
| 9,397,337 B2 | 7/2016 | Gor et al. |
| 9,711,775 B2 | 7/2017 | Murakami et al. |
| 9,711,776 B2 | 7/2017 | Murakami et al. |
| 9,865,857 B2 | 1/2018 | Murakami et al. |
| 10,014,506 B2 | 7/2018 | Murakami et al. |
| 10,340,493 B2 | 7/2019 | Jang et al. |
| 2002/0034689 A1* | 3/2002 | Hoshida ................ B29C 55/005 428/317.9 |
| 2010/0178545 A1 | 7/2010 | Pan et al. |
| 2012/0258349 A1 | 10/2012 | Hayakawa et al. |
| 2014/0178740 A1* | 6/2014 | Ryu ....................... H01G 11/52 429/144 |
| 2014/0248525 A1* | 9/2014 | Iwai .................... H01M 50/426 429/144 |
| 2014/0302398 A1 | 10/2014 | Gor et al. |
| 2015/0303003 A1 | 10/2015 | Ha et al. |
| 2016/0126520 A1 | 5/2016 | Mizuno et al. |
| 2017/0033347 A1 | 2/2017 | Murakami et al. |
| 2017/0033348 A1 | 2/2017 | Murakami et al. |
| 2017/0133652 A1 | 5/2017 | Jang et al. |
| 2017/0141373 A1 | 5/2017 | Murakami et al. |
| 2017/0170443 A1 | 6/2017 | Murakami et al. |
| 2018/0123106 A1 | 5/2018 | Shin et al. |
| 2019/0245183 A1 | 8/2019 | Jeong et al. |

FOREIGN PATENT DOCUMENTS

| | | |
|---|---|---|
| JP | 2012-227135 A | 11/2012 |
| JP | 2015-501519 A | 1/2015 |
| JP | 2015-162313 A | 9/2015 |
| JP | 2017-135055 A | 8/2017 |
| KR | 10-2009-0118089 A | 11/2009 |
| KR | 10-2012-0114170 A | 10/2012 |
| KR | 10-1330675 B1 | 11/2013 |
| KR | 10-2014-0026009 A | 3/2014 |
| KR | 10-2014-0050877 A | 4/2014 |
| KR | 10-2014-0147742 A | 12/2014 |
| KR | 10-2015-0045407 A | 4/2015 |
| KR | 10-2016-0088434 A | 7/2016 |
| KR | 10-2017-0024574 A | 3/2017 |
| KR | 10-2017-0053010 A | 5/2017 |
| KR | 10-1750325 B1 | 6/2017 |
| KR | 10-2017-0120943 A | 11/2017 |

OTHER PUBLICATIONS

Liu et al., "A study on PVDF-HFP gel polymer electrolyte for lithium-ion batteries", IOP Conf. Series: Materials Science and Engineering, 2017, vol. 213, pp. 1-6 ( 7 pages).

International Search Report (PCT/ISA/210) issued in PCT/KR2018/016557, dated Apr. 12, 2019.

* cited by examiner

[FIG. 3]

|  | COMPARATIVE EXAMPLE 1 | EXAMPLE 1 |
|---|---|---|
| FORCE OF ADHESION BETWEEN SEPARATOR AND COATING LAYER AT INTERFACE THEREBETWEEN(15mm/gf) | 80 | 110 |
| THERMAL SHRINKAGE RATE(150°C 1hr) | 40/35 | 15/10 |

[FIG. 4]

|  | COMPARATIVE EXAMPLE 2 | EXAMPLE 2 |
|---|---|---|
| PARTICLE SIZE | 10 or more | 3 |
| PRECIPITATION SPEED | 100 or more | 9 |

SEPARATOR INCLUDING POROUS POLYMER SUBSTRATE, POROUS COATING LAYER, AND RESIN LAYER AND ELECTROCHEMICAL DEVICE HAVING THE SAME APPLIED THERETO

TECHNICAL FIELD

This application claims the benefit of priority to Korean Patent Application No. 2018-0002493 filed on Jan. 8, 2018, the disclosure of which is hereby incorporated by reference herein its entirety.

The present invention relates to a separator for secondary batteries and an electrochemical device having the same applied thereto, and more particularly to a separator for secondary batteries that allows the amount of a dispersing resin that is used and the amount of a dispersant that is used to be reduced in order to prevent an increase in resistance after the separator is coated, which occurs in the case in which a large amount of the dispersing resin is used in order to disperse inorganic matter, and an electrochemical device having the same applied thereto.

BACKGROUND ART

Secondary batteries, which are capable of being charged and discharged, have attracted considerable attention as power sources for devices requiring high output and large capacity, including an electric vehicle (EV), a hybrid electric vehicle (HEV), and a plug-in hybrid electric vehicle (Plug-In HEV), which have been developed to solve problems, such as air pollution, caused by existing gasoline and diesel vehicles using fossil fuels.

Secondary batteries may be classified into a cylindrical battery cell, a prismatic battery cell, and a pouch-shaped cell based on the shape thereof. Meanwhile, an electrode assembly, which is a power-generating element that includes a positive electrode, a separator, and a negative electrode, which are stacked, and that can be charged and discharged, is mounted in a battery case. The electrode assembly is classified as a jelly-roll type electrode assembly, which is configured to have a structure in which a long sheet type positive electrode and a long sheet type negative electrode, to which active materials are applied, are wound in the state in which a separator is disposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are disposed respectively between the positive electrodes and the negative electrodes.

In order to secure and improve the safety of a lithium secondary battery, the physical and electrochemical safety of a separator, which is one of the components constituting the lithium secondary battery, is particularly important. A separator for lithium secondary batteries that is generally used is a polyolefin-based micro-scale porous thin film made of polyethylene or polypropylene. In the case of the polyolefin-based separator, the thermal safety of the main material that constitutes the separator is not high, whereby the micro-scale porous film may be easily damaged or deformed due to an increase in temperature caused as the result of abnormal behavior of the battery. In addition, a short circuit may occur between electrodes due to damage or deformation of the micro-scale porous film. Furthermore, the battery may overheat, catch fire, or explode. In recent years, a large number of cases of combustion or explosion of batteries has been reported. The reason for this is that the safety of the batteries, which must essentially accompany an increase in the capacity of the batteries, has not been sufficiently secured.

A method of forming a coating layer including inorganic matter on a polyolefin-based film in order to improve the thermal safety of a separator, thereby improving the safety of a battery is used as one of the methods of improving the safety of the battery.

However, it is necessary to develop technology for preventing an increase in resistance after the separator is coated due to an increase in the amount of a dispersing resin, which is introduced in order to increase the dispersivity of inorganic matter, which is introduced in order to form the separator, and enabling an expensive dispersant to be used in a small amount.

As the prior art, Korean Patent Application Publication No. 2009-0118089 discloses a micro-scale porous polymer separator for lithium ion batteries characterized in that the micro-scale porous polymer separator is manufactured by polymerizing polyvinyl alcohol and a hydrophobic monomer in an aqueous solution using water, serving as a reaction medium, and an initiator in order to manufacture a polymer colloid emulsion, coating the polymer colloid emulsion on a plastic base band through a cast-coating process, and drying and peeling the same. However, the composition of a separator slurry including a dispersing resin having a limited weight average molecular weight and a dispersant in limited amounts is not disclosed.

Korean Patent Application Publication No. 2017-0024574 discloses a composite separator for electrochemical devices including a porous polymer substrate and a porous coating layer formed on at least one surface of the porous polymer substrate, wherein the composite separator includes an electrode adhesion layer formed on both or at least one of the outermost surfaces thereof, the porous coating layer includes inorganic particles and a binder resin, the entirety or a portion of the surface of each of the inorganic particles is covered with the binder resin, whereby the inorganic particles accumulate due to point binding and/or surface binding between the inorganic particles and thus have a stratified formation, the porous coating layer has a porous structure resulting from interstitial volumes between the inorganic particles, the electrode adhesion layer includes a particle-type polymer having an adhesive property, and the particle-type polymer has a glass transition temperature of −110° C. to 0° C. However, the composition of a dispersing resin and a dispersant, characterized in that the dispersivity of the dispersing resin and the dispersant is improved even in the case in which the dispersing resin and the dispersant are introduced in small amounts, is not disclosed.

Korean Patent Application Publication No. 2017-0053010 discloses a composite separator for electrochemical devices, including a porous polymer substrate and a porous coating layer formed on at least one surface of the porous polymer substrate, wherein the composite separator includes an electrode adhesion layer formed on both or at least one of the outermost surfaces thereof, the porous coating layer includes inorganic particles and a binder resin, the entirety or a portion of the surface of each of the inorganic particles is covered with the binder resin, whereby the inorganic particles accumulate due to point binding and/or surface binding between the inorganic particles and thus have a stratified formation, the porous coating layer has a porous structure resulting from interstitial volumes between the inorganic particles, the electrode adhesion layer includes a particle-type polymer having an adhesive property, and the particle-type polymer has a glass transition temperature of −110° C. to 0° C. However, the composition of a dispersing resin and a dispersant, characterized in that the dispersivity of the dispersing resin and the dispersant is improved even in the case in which the dispersing resin and the dispersant are introduced in small amounts, is not disclosed.

Korean Registered Patent Publication No. 1750325 discloses a porous substrate having pores therein and a porous separator formed on at least one surface of the porous substrate, wherein the porous separator includes a mixture of a thermally expandable microcapsule, including a liquid hydrocarbon and an ethylene-based polymer cell configured to carry the liquid hydrocarbon, and a binder polymer, and the volume of the ethylene-based polymer cell expands at a temperature higher than the softening temperature thereof. However, the composition of a separator slurry including a dispersing resin having a limited weight average molecular weight and a dispersant in limited amounts is not disclosed.

Therefore, there is urgent necessity for technology pertaining to a separator for secondary batteries having technical features of a dispersing resin and a dispersant that are capable of improving dispersivity without using the dispersing resin in an excessive amount and that are capable of preventing resistance characteristics after an inorganic slurry is coated on a porous separator.

PRIOR ART DOCUMENT (Patent Document 1) Korean Patent Application Publication No. 2009-0118089
(Patent Document 2) Korean Patent Application Publication No. 2017-0024574
(Patent Document 3) Korean Patent Application Publication No. 2017-0053010
(Patent Document 4) Korean Registered Patent Publication No. 1750325

DISCLOSURE

Technical Problem

The present invention has been made in view of the above problems and other technical problems that have yet to be resolved, and it is an object of the present invention to provide a separator for secondary batteries, the dispersivity of which is improved even when introduced in a small amount, and an electrochemical device having the same applied thereto.

It is an object of the present invention to provide a separator for secondary batteries that is capable of preventing an increase in resistance after an inorganic slurry is coated on the separator and an electrochemical device having the same applied thereto.

It is a further object of the present invention to provide a separator for secondary batteries that is capable of achieving the same or higher dispersion effect even when an expensive dispersant is used in a small amount and an electrochemical device having the same applied thereto.

Technical Solution

In accordance with an aspect of the present invention, the above and other objects can be accomplished by the provision of
a separator for secondary batteries, the separator including a porous polymer substrate having therein a plurality of pores and a porous coating layer disposed on an area of at least one surface of the porous polymer substrate or on an area of at least one surface of the porous substrate and the pores in the porous substrate, wherein the porous coating layer (also referred to herein as an inorganic layer) includes inorganic particles, a dispersing resin having a weight average molecular weight of 500,000 or more or a viscosity of 550 cps or more and a dispersant, and a resin layer disposed on at least one surface of the porous coating layer opposite the porous polymer substrate.

In addition, the dispersing resin may be a polymer resin including a cyano group.

In addition, the dispersant may be a fatty acid.

In addition, the total amount of the polymer resin and the fatty acid may be 0.5 wt % to 10 wt % based on the weight of the inorganic particles.

In addition, the amount of the fatty acid may be 1 wt % to 30 wt % of the amount of the polymer resin.

In addition, the composition that constitutes the inorganic layer may include less than 10 wt % of the dispersing resin and less than 3 wt % of the dispersant based on 100 wt % of the inorganic particles.

In addition, the dispersant may be a branched or unbranched saturated or unsaturated fatty acid having 8 to 22 carbon atoms.

In addition, the porous polymer substrate may be (a) a polymer film including one polymer or a mixture of two or more polymers selected from the group consisting of polyethylene, polypropylene, polyethylene terephthalate, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene oxide, cyclic olefin copolymer, polyphenylene sulfide, and polyethylene naphthalene, (b) a multiple film comprising a plurality of polymer films, (c) woven fabric, or (d) non-woven fabric.

In addition, the inorganic particles may be selected from the group consisting of inorganic particles having a dielectric constant of 5 or higher, inorganic particles having lithium ion transfer ability, and a mixture thereof.

In accordance with another aspect of the present invention, there is provided an electrochemical device including a positive electrode, a negative electrode, and the separator having the above technical features, the separator being interposed between the positive electrode and the negative electrode In accordance with a further aspect of the present invention, there is provided a method of manufacturing a separator, the method including dissolving a dispersing resin and a dispersant including a fatty acid in a solvent to form a binder solution, adding inorganic particles to the binder solution and stirring to form a slurry having the inorganic particles dispersed therein, applying the slurry to at least one surface of a porous substrate having pores therein, and drying the slurry applied to the at least one surface of the porous substrate, wherein as the drying step is performed, a porous coating layer and a resin (also referred to herein as a binder) layer are sequentially formed on the porous substrate in the thickness direction thereof, the dispersing resin is a polymer resin including a cyano group having a weight average molecular weight of 500,000 or more or a viscosity of 550 cps or more, the dispersing resin is present in an amount of less than 10 wt % based on 100 wt % of the inorganic particles, the dispersant is present in an amount of less than 3 wt % based on 100 wt % of the inorganic particles, and the porous coating layer is located on an area of at least one surface of the porous substrate or on an area of at least one surface of the porous substrate and the pores in the porous substrate.

The structure and the manufacturing method of the electrochemical device are well known in the art to which the present invention pertains, and thus a detailed description thereof will be omitted.

FIG. is a flowchart showing a method of manufacturing a separator according to an embodiment of the present invention.

FIG. 3 is a view showing the results of improvement in the physical properties of the separator according to the embodiment of the present invention when the separator is coated.

FIG. 4 is a view showing the results of improvement in the dispersivity of a slurry according to an embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description known functions and configurations incorporated herein will be omitted when the same may obscure the subject matter of the present invention.

Figure 1:
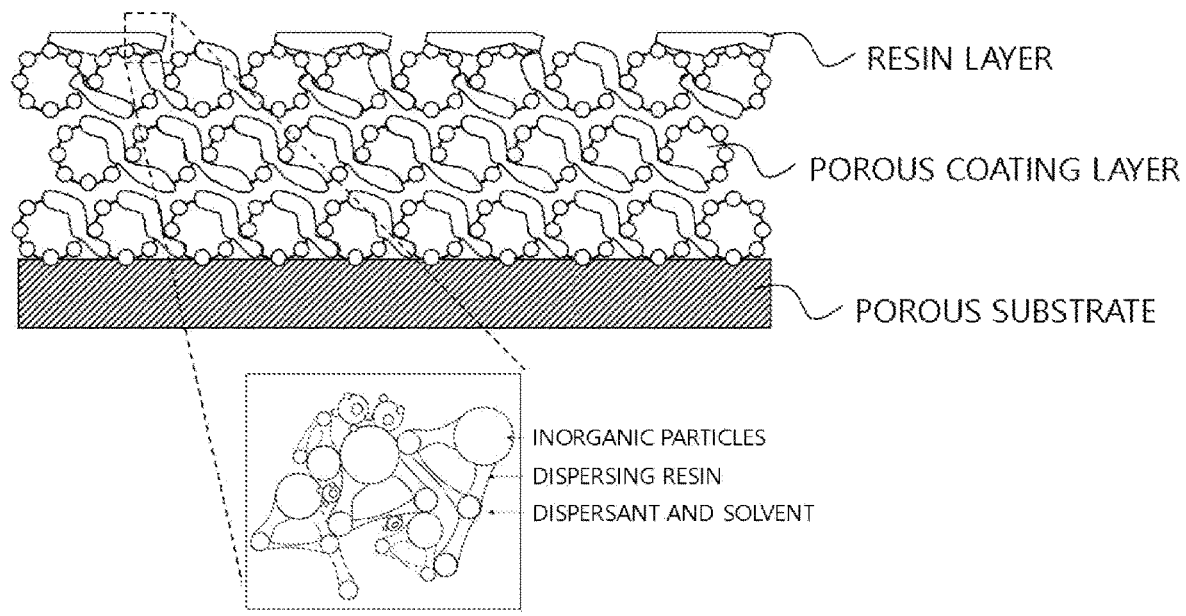
FIG. 1 is a conceptual view showing a separator, which includes a porous substrate, a porous coating layer, and a binder layer, manufactured according to an embodiment of the present invention.

FIG. 1 is a sectional view schematically showing a separator, which includes a porous substrate, a porous coating layer, and a binder layer, manufactured according to an embodiment of the present invention with a conceptual view showing a slurry liquid configured to form the coating layer.

A separator according to an aspect of the present invention includes a porous substrate having therein a plurality of pores, a porous coating layer formed on an area of at least one surface of the porous substrate and at least one of the pores in the porous substrate, the porous coating layer including a plurality of inorganic particles and a binder located on a portion or the entirety of the surface of each of the inorganic particles, the binder being configured to interconnect and fix the inorganic particles, and a binder layer formed on the porous coating layer. Here, the binder layer according to the present invention is porous, whereby the ion conductivity of the separator is improved. In particular, the force of adhesion with an electrode is excellent.

In addition, the binder layer serves as an electrode adhesive layer that is capable of easily achieving adhesion between the porous coating layer and the electrode when a battery, including an electrode assembly, is assembled in a subsequent process.

Any porous substrate may be used, as long as the porous substrate is generally used for an electrochemical device. In a nonrestrictive example, the porous substrate may be a polymer film made of one polymer or a mixture of two or more polymers selected from the group consisting of polyethylene, polypropylene, polyethylene terephthalate, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene oxide, cyclic olefin copolymer, polyphenylene sulfide, and polyethylene naphthalene, a multi-layer film including a plurality of polymer films, woven fabric, or non-woven fabric. However, the present invention is not limited thereto.

The thickness of the porous substrate is not particularly restricted. For example, the thickness of the porous substrate may be about 5 to 50 μm. The size of each pore in the porous substrate and the porosity of the porous substrate are also not particularly restricted. For example, the size of each pore in the porous substrate may be about 0.01 to about 50 μm, and the porosity of the porous substrate may be about 10 to about 95%.

A dispersing resin serving as the binder is a cyano-based resin, and it is obvious that the dispersing resin may be selected from among polymers including cyano groups.

In the present invention, however, a high-molecular-weight cyano resin is used as the cyano resin applied to the dispersing resin in order to improve dispersibility and adhesiveness even though the dispersing resin is introduced in a small amount.

The weight average molecular weight (Mw) of the cyano resin may be 500,000 or more.

The viscosity of the cyano resin may be 550 cps or more.

The viscosity of the cyano resin was measured using a Brookfield viscometer (LV model) in the state in which 20 wt % of the cyano resin was dissolved in a DMF solution under conditions of spindle speeds of 52 and 12 rpm.

In addition to the above-described dispersing resin, an additional binder may be further mixed as the dispersing resin in order to increase the degree of binding between the inorganic particles and to improve the durability of the porous coating layer. In a nonrestrictive example, polyarylate, polyvinylidene fluoride (PVdF), polyvinylidene fluoride-hexafluoropropylene, polyvinylidene fluoride-co-trichloroethylene, polymethylmethacrylate, polyacrylonitrile, polyvinylpyrrolidone, polyvinylacetate, polyethyleneco-vinyl acetate, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, acrylonitrile-styrene-butadiene copolymer, and polyimide may be used as the additional binder, either alone or in a combination of two or more components.

Optionally, according to an embodiment of the present invention, the porous coating layer may further include a dispersant.

In addition, the dispersant may be made of a fatty acid.

In addition, the total amount of the polymer resin and the fatty acid may be 0.5 wt % to 10 wt % based on the weight of the inorganic matter.

Preferably, the total amount of the polymer resin and the fatty acid is 1 wt % to 8 wt % based on the weight of the inorganic matter. In the case in which the total amount of the polymer resin and the fatty acid deviates from the above range, the resistance characteristics of the separator may be deteriorated after the separator is coated.

In addition, the amount of the fatty acid may be 1 wt % to 30 wt % based on the amount of the polymer resin.

Preferably, the amount of the fatty acid is 1 wt % to 20 wt % based on the amount of the polymer resin. More preferably, the amount of the fatty acid is 1 wt % to 10 wt % based on the amount of the polymer resin. In the case in which the amount of the fatty acid deviates from the above range, the thermal safety of the separator may be deteriorated after the separator is coated.

In addition, a composition that constitutes the inorganic layer may include less than 10 wt % of the dispersing resin and less than 3 wt % of the dispersant based on 100 wt % of the inorganic matter.

The amount percentage of the dispersant may be 1 to 30 according to the following equation.

Amount percentage=(amount of dispersant (g)/ amount of dispersing resin (g))×100

In addition, the dispersant may be a branched-type or unbranched-type saturated or unsaturated fatty acid having 8 to 22 carbon atoms.

A mixture of fatty acids may be used.

In the same manner, a mixture of the above-described fatty acid and a carboxylic acid having 2 to 6 carbon atoms, such as an acetic acid or a propionic acid, may be used.

Preferably, the fatty acid is at least one selected from among saturated or unsaturated fatty acids each having 10 to 18 carbon atoms, such as an acetic acid, a propionic acid, a butyric acid, a valeric acid, a caproic acid, an enanthic acid, a caprylic acid, a pelargonic acid, a capric acid, a lauric acid, a myristic acid, a palmitic acid, a stearic acid, an arachidic acid, a behenic acid, a lignoceric acid, a cerotic acid, an α-linolenic acid, an eicosapentaenoic acid, a docosahexaenoic acid, a linoleic acid, an γ-linolenic acid, a dihomo-γ-linolenic acid, an arachidonic acid, a paullinic acid, an oleic acid, an elaidic acid, an eicosenoic acid, an erucic acid, and a nervonic acid.

The dispersant may be one or a mixture of two or more selected from the group consisting of acrylic-based copolymers. This dispersant exhibits the function of an excellent dispersant that is capable of improving the dispersivity of the inorganic matter. In addition, the dispersant has a function as a binder having adhesive force in addition to the excellent function as the dispersant.

This dispersant includes a polar group. Since the dispersant has a polar group, the dispersant may interact with the surface of the inorganic matter to increase the force of dispersion of the inorganic matter. In addition, it is easy to control the physical properties of the dispersant and to improve dispersivity and adhesive force in a balanced state, whereby the dispersant may contribute to the stability of a separator including the dispersant and the stability of an electrochemical device using the separator.

The inorganic particles are not particularly restricted, as long as the inorganic particles are electrochemically stable. That is, the inorganic particles that can be used in the present invention are not particularly restricted, as long as the inorganic particles are not oxidized and/or reduced within the operating voltage range (e.g. 0 to 5 V based on Li/Li$^+$) of an electrochemical device to which the inorganic particles are applied. Particularly, in the case in which inorganic particles having ion transfer ability are used, ion conductivity in the electrochemical device may be increased, whereby it is possible to improve the performance of the electrochemical device.

Also, in the case in which inorganic particles having high permittivity are used as the inorganic particles, the degree of dissociation of electrolyte salt, such as lithium salt, in a liquid electrolyte may be increased, whereby it is possible to improve the ion conductivity of the electrolytic solution.

For the above reasons, the inorganic particles may include high-permittivity inorganic particles having a dielectric constant of 5 or higher, for example, 10 or higher, inorganic particles having lithium ion transfer ability, or a mixture thereof. Nonrestrictive examples of inorganic particles having a dielectric constant of 5 or higher may include BaTiO$_3$, Pb(Zr, Ti)O$_3$(PZT), Pb$_{1-x}$La$_x$Zr$_{1-y}$Ti$_y$O$_3$ (PLZT), PB (Mg$_3$Nb$_{2/3}$)O$_3$—PbTiO$_3$ (PMN-PT) hafnia (HfO$_2$) SrTiO$_3$, SnO$_2$, CeO$_2$, MgO, NiO, CaO, ZnO, ZrO$_2$, Y$_2$O$_3$, Al$_2$O$_3$, TiO$_2$, SiC, and a mixture thereof.

The inorganic particles, such as BaTiO$_3$, Pb(Zr, Ti)O$_3$ (PZT), Pb$_{1-x}$La$_x$Zr$_{1-y}$Ti$_y$O$_3$ (PLZT), PB(Mg$_3$Nb$_{2/3}$)O$_3$—PbTiO$_3$ (PMN-PT), or hafnia (HfO$_2$), not only exhibit high dielectric characteristics having a dielectric constant of 100 or higher but also have piezoelectricity in which, when the inorganic particles are tensioned or compressed with a predetermined pressure, electric charges are generated, whereby a potential difference is generated between the two faces. Consequently, it is possible to prevent the occurrence of a short circuit across two electrodes due to external impact, whereby it is possible to improve the safety of the electrochemical device. Also, in the case in which the high-permittivity inorganic particles and the inorganic particles having lithium ion transfer ability are used together, the synergetic effect thereof may be doubled.

The size of each of the inorganic particles is not restricted. In order to form a coating layer having a uniform thickness and to realize appropriate porosity, however, the size of each of the inorganic particles may be about 0.01 to about 10 jam or about 0.05 to about 1.0 on if possible. In the case in which the size of each of the inorganic particles satisfy the above range, dispersivity may be improved, whereby it is easy to control the physical properties of the separator, and it is possible to prevent the occurrence of a problem in which the mechanical properties of the separator are deteriorated due to an increase in the thickness of the porous coating layer or in which a short circuit occurs in the battery when the battery is charged and discharged due to excessively large-sized pores.

The composition ratio of the inorganic particles in the porous coating layer to the binder including the dispersing resin may be, for example, about 50:50 to about 99:1 or about 60:40 to about 95:5. The thickness of the porous coating layer, constituted by the inorganic particles and the binder, is not particularly restricted. For example, the thickness of the porous coating layer may be about 0.01 to about 20 μm. In addition, the size of each pore in the porous coating layer and the porosity of the porous coating layer are also not particularly restricted. For example, the size of each pore in the porous coating layer may be about 0.01 to about 5 μm, and the porosity of the porous coating layer may be about 5 to about 75%.

It is obvious that other additives usually used in the art to which the present pertains may be further included as ingredients of the porous coating layer, in addition to the above-described inorganic particles and polymers.

In accordance with another aspect of the present invention, there is provided an electrochemical device, such as a lithium secondary battery, including a positive electrode, a negative electrode, and the separator interposed between the positive electrode and the negative electrode.

Figure 2:
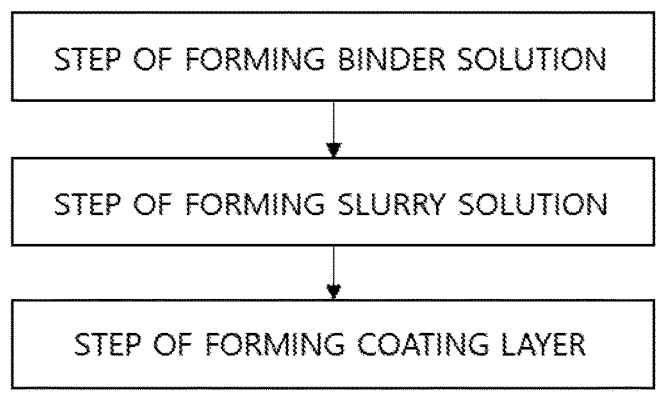

FIG. 2 is a flowchart schematically showing a method of manufacturing a separator according to an embodiment of the present invention. Referring to FIG. 2, in accordance with a further aspect of the present invention, there is provided a separator-manufacturing method including a step of forming a binder solution (S1), a step of forming a slurry (S2), and a step of forming a porous coating layer (S3).

It is preferable to use a solvent having a solubility parameter similar to the solubility parameter of the binder and a low melting point as the solvent. The reason for this is that uniform mixing may be achieved and that it is then easy to remove the solvent. In particular, it is preferable to use a polar solvent having a melting point of less than 100° C. as the solvent. However, a nonpolar solvent is not desirable. The reason for this is that dispersion force may be reduced.

In a nonrestrictive example, the solvent may be one or a mixture of two or more selected from the group consisting of acetone, tetrahydrofuran, methylene chloride, chloroform, dimethylformamide, N-methyl-2-pyrrolidone (NMP), cyclohexane, and water.

The solvent is included in an amount of about 50 wt % to about 90 wt % based on a total of 100 wt % of the solids and the solvent, i.e. a total of 100 wt % of a mixture of solids, including an inorganic matter, two kinds of binders, and a dispersant, and a solvent (for example, a polar solvent). In the case in which the amount of the solvent is less than 50 wt's based on a total of 100 wt % of the solids and the solvent, coatability is deteriorated due to an increase in viscosity, it is very difficult to form the binder layer, and it is difficult to achieve a thin film. In the case in which the amount of the solvent is greater than 90 wt % based on a total of 100 wt % of the solids and the solvent, on the other hand, productivity may be lowered, and manufacturing costs may be increased.

At step S2, inorganic particles are added to the binder solution formed at step S1, and the mixture is stirred to form a slurry having the inorganic particles dispersed therein.

After the inorganic particles are added to the binder solution, the inorganic particles may be crushed. At this time, about 1 to about 20 hours are appropriate as crushing time, and the particle size of each of the crushed inorganic particles may be about 0.01 to about 3 µm. A general method may be used as a crushing method. In particular, a milling method, such as a ball-milling method, may be used.

A conventional coating method known in the art to which the present invention pertains may be used as a method of coating the slurry having the inorganic particles dispersed therein on the porous substrate. For example, a dip-coating method, a die-coating method, a roll-coating method, a comma-coating method may be used, either alone or in a combination of two or more components. In addition, the porous coating layer may be formed on opposite surfaces of the porous substrate, or may be selectively formed on only one surface of the porous substrate.

Any method known in the art to which the present invention pertains may be used as a drying method. Drying may be performed in a batch fashion or in a continuous fashion using an oven or a heated-type chamber within a temperature range set in consideration of the vapor pressure of the solvent that is used. The drying is performed to remove almost all of the solvent from the slurry. It is preferable to perform the drying as fast as possible in consideration of productivity. For example, the drying may be performed for 1 minute or less, preferably 30 seconds or less.

Hereinafter, detailed examples of the present invention will be described with reference to the accompanying drawings.

(Example 1 and Comparative Example 1)

5 to 10 wt % of a dispersant was added to a dispersing resin including a cyano group having a weight average molecular weight of 300,000 to 400,000 to manufacture a slurry and the slurry was coated on a separator as Comparative Example 1, and 5 to 10 wt % of a dispersant was added to a dispersing resin including a cyano group having a weight average molecular weight of 500,000 to 600,000 to manufacture a slurry and the slurry was coated on a separator as Example 1.

[84] A double-sided adhesive tape was attached to a glass plate, a separator having a length of 60 mm and a width of 15 mm was attached to the adhesive tape, and the separator attached to the adhesive tape was pulled by 180 degrees at a peeling speed of 300 mm/min using a universal testing machine (UTM) in order to measure the force of adhesion between the separator and the coating layer at the interface therebetween.

As shown in FIG. 3, comparing the force of adhesion between the separator and the coating layer at the interface therebetween, it can be seen that the measured force of adhesion was 80 gf/15 mm in the case of Comparative Example 1, whereas the measured force of adhesion was 110 gf/15 mm in the case of Example 1, whereby the force of adhesion was increased.

Also, in the case in which the thermal shrinkage rate (MD/TD) was measured under conditions of 150° C. and 1 hour, it can be seen that the thermal shrinkage rate was 401/35% in the case of Comparative Example 1, whereas the thermal shrinkage rate was 151/10% in the case of Example 1, indicating that the thermal shrinkage rate was improved.

Also, in the case in which a cyano resin having a weight average molecular weight of 500,000 or more or a viscosity of 550 cps or more was used and in which the percentage of the dispersant was 30% or more, it can be seen that the force of adhesion between the separator and the coating layer at the interface therebetween was decreased to 20 gf/15 mm and that the thermal shrinkage rate was increased to 481/45%.

(Example 2 and Comparative Example 2)

Only a dispersing resin including a cyano group having a weight average molecular weight of 500,000 to 600,000 was used to manufacture a slurry and the slurry was coated on a separator as Comparative Example 2, and 5 to 10 wt % of a dispersant was added to a dispersing resin including a cyano group having a weight average molecular weight of 500,000 to 600,000 to manufacture a slurry and the slurry was coated on a separator as Example 2.

It was possible to confirm the optimum mixing ratio of the dispersant to the dispersing resin. It can be seen that, in the case in which the dispersant and the dispersing resin were mixed at an appropriate mixing ratio in order to manufacture a slurry, dispersivity was improved.

In a particle diameter distribution curve, the particle size D50 means the particle diameter corresponding to 50% of the quantity of particles that are accumulated. The average particle diameter of the particles was measured using a particle size analyzer (Product name: MASTERSIZER 3000 and Manufacturer: Malvern).

The precipitation speed of the particles over time was measured in the state in which centrifugal force was applied at a rotational speed of 1000 rpm using a dispersion analyzer (Product name: Lumisizer and Manufacturer: LUM).

As shown in FIG. 4, it can be seen that the particle size D50 (µm) of Comparative Example 2, based on which dispersivity could be determined, was 10 or more, which was different from 3, which was the particle size of Example 2, and that the precipitation speed (µm/s) of the Comparative Example 2 was 100 or more, which was lower than 9, which was the precipitation speed in Example 2, indicating that dispersivity was very low.

Those skilled in the art to which the present invention pertains will appreciate that various applications and modifications are possible based on the above description without departing from the scope of the present invention.

INDUSTRIAL APPLICABILITY

As is apparent from the above description, a separator for secondary batteries according to the present invention and an electrochemical device having the same applied thereto have an effect in that the amount of a dispersing resin is reduced, whereby it is possible to prevent an increase in resistance after a porous separator is coated.

In addition, the separator and the electrochemical device have an effect in that a dispersing resin having a specific weight average molecular weight is mixed, whereby physical properties and dispersivity are improved.

In addition, the separator and the electrochemical device have an effect in that the use of an expensive dispersant is excluded, whereby processing costs are reduced.

In addition, the separator and the electrochemical device have an effect in that it is possible to solve a problem in which interfacial adhesion force and high-temperature thermal shrinkage rate are lowered after the separator is coated.

The invention claimed is:

1. A separator for secondary batteries, the separator comprising:
    a porous polymer substrate having therein a plurality of pores; and
    a porous coating layer disposed on an area of at least one surface of the porous polymer substrate or on an area of at least one surface of the porous polymer substrate and the pores in the porous polymer substrate, wherein the porous coating layer comprises:
    inorganic particles,
    a dispersing resin having a weight average molecular weight of 500,000 to 600,000 and a viscosity of 550 cps or more, and
    a dispersant; and
    a resin layer disposed on at least one surface of the porous coating layer opposite the porous polymer substrate.

2. The separator for secondary batteries according to claim 1, wherein the inorganic particles are selected from the group consisting of inorganic particles having a dielectric constant of 5 or higher, inorganic particles having lithium ion transfer ability, and a mixture thereof.

3. The separator for secondary batteries according to claim 1, wherein the porous polymer substrate is (a) a polymer film comprising one polymer or a mixture of two or more polymers selected from the group consisting of polyethylene, polypropylene, polyethylene terephthalate, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene oxide, cyclic olefin copolymer, polyphenylene sulfide, and polyethylene naphthalene, (b) a multiple film comprising a plurality of polymer films, (c) woven fabric, or (d) non-woven fabric.

4. The separator for secondary batteries according to claim 1, wherein a composition is employed to prepare the porous coating layer and the resin layer comprises less than 10 wt % of the dispersing resin and less than 3 wt % of the dispersant based on 100 wt % of the inorganic particles.

5. The separator for secondary batteries according to claim 4, wherein the dispersant is a branched saturated fatty acid, branched unsaturated fatty acid, unbranched saturated fatty acid, or unbranched unsaturated fatty acid having 8 to 22 carbon atoms.

6. The separator for secondary batteries according to claim 1, wherein the dispersing resin is a polymer resin comprising a cyano group.

7. The separator for secondary batteries according to claim 6, wherein the dispersant is a fatty acid.

8. The separator for secondary batteries according to claim 7, wherein a total amount of the polymer resin and the fatty acid is 0.5 wt % to 10 wt % based on a weight of the inorganic particles.

9. The separator for secondary batteries according to claim 7, wherein an amount of the fatty acid is 1 wt % to 30 wt % based on an amount of the polymer resin.

10. An electrochemical device comprising a positive electrode, a negative electrode, and the separator for secondary batteries according to claim 1, the separator for secondary batteries being interposed between the positive electrode and the negative electrode.

11. A method of manufacturing a separator, the method comprising:
    dissolving a dispersing resin and a dispersant comprising a fatty acid, in a solvent to form a binder solution;
    adding inorganic particles to the binder solution and stirring to form a slurry having the inorganic particles dispersed therein;
    applying the slurry to at least one surface of a porous substrate having pores therein; and
    drying the slurry applied to the at least one surface of the porous substrate,
    wherein as the drying step is performed, a porous coating layer and a resin layer are sequentially formed on the porous substrate in a thickness direction thereof,
    the dispersing resin is a polymer resin comprising a cyano group having a weight average molecular weight of 500,000 to 600,000 and or a viscosity of 550 cps or more,
    the dispersing resin is present in an amount of less than 10 wt % based on 100 wt % of the inorganic particles,
    the dispersant is present in an amount of less than 3 wt % based on 100 wt % of the inorganic particles, and
    the porous coating layer is located on an area of at least one surface of the porous substrate or on an area of at least one surface of the porous substrate and the pores in the porous substrate.

* * * * *